UNITED STATES PATENT OFFICE.

DAVID F. SHOPE, OF PORTLAND, OREGON.

PROCESS OF WATERPROOFING AND ORNAMENTING OBJECTS.

1,270,450.     Specification of Letters Patent.     Patented June 25, 1918.

No Drawing.     Application filed November 28, 1917. Serial No. 204,320.

*To all whom it may concern:*

Be it known that I, DAVID F. SHOPE, a citizen of the United States, residing at Portland, in the county of Multnomah and State of Oregon, have invented new and useful Improvements in Processes of Waterproofing and Ornamenting Objects, of which the following is a specification.

My invention relates to a class of processes or methods of waterproofing various objects or materials in place and at the same time to ornament them if desired.

The object of my invention is to provide a process or method wherein and whereby a desired waterproofing composition may be effectively applied to the surface of materials, for example, brick, stone, concrete and many others, in such a manner as to make them non-absorbent of moisture and non-receptive of water. Also in the process to apply coloring and ornamental materials to such surfaces. My process is thus applicable to the surface of material in place in buildings and various structures, as also to concrete, brick and other materials in ornamental objects, such as urns, vases, flower boxes, clocks, etc. These objects, as well as others, I accomplish by the process or method hereinafter described.

It should be primarily kept in mind, that my said process is intended to be and is used upon materials, either in place, or ready to be put in place. The process is applied to subjects composed of materials which are already formed, cured or in such state that the surfaces thereof may be treated as herein described. In other words, my process is not intended to be employed for objects having their composing material in a semi-dry or plastic state; with a view to making the composition I so employ an integral part thereof while such objects are in that state.

In the prior practice of the art appertaining to my invention, the methods usually employed have required the use of a trowel or some float implement, or what is commonly known as the "cement gun," or some other means whereby a so-called waterproofing or ornamental composition, or a combination thereof, has been applied to a surface from a distance with a striking or impinging force, or else such compositions are spread over and upon the surface to be treated by an implement which spreads and presses the composition into an adhesion upon the surface, but, in either case, always in an irregular and faulty manner. The compositions thus used have been generally a cementitious mortar mixed with sand or fine gravel and water, or a like composition. The failure of all prior methods has been due to the fact that a trowel or spreader implement necessarily involves the application of a greater quantity of material to the surface treated than it requires, also to the fact that such a process invariably tends to draw the moisture and richer material of the mixture outwardly toward the implement used, and thus to disturb the proper balance or cohesion of the elements of the composition, and makes a poor bond. This weakens its binding qualities or adhesive properties in relation to the treated surface, and in time causes the composition to peel or split away. In such event it is practically impossible to patch the work, and the surface must be treated again as a whole, often many times. Further, the cement gun, or any other means of applying such compositions by forcing them upon the treated surface from a distance, are failures for like reasons, and undoubtedly more so. These last methods obviously will never result in a satisfactory appearance of the finished work, and they will strain or displace the material in a manner to deteriorate or destroy its adhesive properties in relation to the treated surface, to such an extent that moisture is invariably absorbed through the imperfections, and expansion and contraction inevitably occur, all of which causes the material to become loose and in time peel or fall away.

In my present process or art I have sought to overcome all prior difficulties and particularly those of the kind which have caused failures such as are referred to.

In practice I usually employ a plastic material composed of hydraulic cement, hydrated lime, coloring material, and mica in desired and suitable proportions, to which water is added in sufficient quantity to form the whole mass into a paste or slurry. The mica used at this stage is only for the purpose of retarding the setting of the composition during my process. Mica for ornamental purposes is added afterward as further described.

Having prepared a suitable composition of waterproofing nature, ornamentally colored, the art or process of its application which I have invented is as now described.

The surface to be treated must be first thoroughly moistened and cleaned. The composition, while in pasty condition, is then applied to and rubbed upon and into the surface to be treated by means of a brush or stubby broom, wielded with a movement as in scrubbing, to cause only the minimum required amount of the material to adhere to and bind itself uniformly upon the surface. Only a suitable portion of the surface must be thus treated at a time, in order that the material shall not harden or set before the next step in the process. When a desired amount of the material is thus rubbed into the surface, the operator next employs a brush with stiff bristles, which must be of a suitable and convenient form, size and weight for the purpose. In practice I have found thus far most adaptable, a brush with tough rice root bristles about one and one-half inches long, loose woven and wire drawn, said brush having a handle of suitable length the better to facilitate striking with the brush. Before the material has set, the operator strikes upon it with the brush, impinging blows through the bristles. This is the step which causes the material to adhere uniformly and bind itself upon the surface in an effective manner. Thereby the voids are completely filled with the minimum amount of material required and the surface presents an even and finished appearance in the nature of a tapestry effect. If it is desired to use mica for further ornament, to produce a reflecting or sparkling surface, the operator employs mica ground to a desired fineness. This is applied immediately after the binding or finishing brush is used and may be sprinkled, thrown or blown upon the material while moist, and in such quantity as may be desired. The mica particles are then retained adhesively in the material with their outer or exposed parts clean and brilliant.

In this connection, it will be noted that prior methods have all required that the ornamental mica be either included in the composition at the outset or forced into it while spread upon the surface in a soft condition and in a manner which causes all parts of the mica to be covered with the composition. This necessitated later treating of the surface of the hardened or set material with acid, or brushing or scraping it to polish the outstanding angles of the mica particles to make a reflecting or sparkling effect. This never produced entirely satisfactory results, was expensive, and yielded a poor or damaged surface of the whole work. This cannot occur with mica used as I describe.

The process which I have thus described must be closely followed, and implements of the character mentioned must be employed to accomplish the results I have thus obtained successfully. Therein resides my novel and useful invention of this art. The composition which I have herein described is one with which I can effectively apply my process, as I have proved in the practice thereof. I may however use other compositions of a like character with equal success. When applied as I have described I obtain a very desirable tapestry finished surface effect.

Having described my invention herein, I claim:

1. In a process of the character described a method which consists in applying a minimum amount of a suitable waterproofing composition in a plastic state upon the finished surface of an object, as follows, first, by applying said composition to a suitable portion of the surface at a time by means of a brush or stubby broom wielded in the operation with a movement as in scrubbing until the minimum amount of the composition is rubbed upon and into the surface and adheres thereto uniformly, second, causing the composition, while slowly setting or hardening, to adhere thoroughly upon the treated surface in a manner to close all pores and form the composition into a coating over the treated surface, impervious to moisture, accomplished by means of a suitable brush having stiff bristles and with it striking the composition all over its surface with impinging blows through the bristles, before the setting takes place, substantially as described.

2. In a process of the character described a method which consists in applying a minimum amount of a suitable waterproofing composition in a plastic state upon the finished surface of an object, as follows, first, by applying said composition to a suitable portion of the surface at a time by means of a brush or stubby broom wielded in the operation with a movement as in scrubbing until the minimum amount of the composition is rubbed upon and into the surface and adheres thereto uniformly, second, causing the composition, while slowly setting or hardening, to adhere thoroughly upon the treated surface in a manner to close all pores and form the composition into a coating over the treated surface, impervious to moisture, accomplished by means of a suitable brush having stiff bristles and with it striking the composition all over its surface with impinging blows through the bristles, before the setting takes place, third, after the last step, to sprinkle, cast or blow upon the composition, while yet plastic, mica, ground to a desired fineness, until the same has firmly adhered to the composition in a manner to leave the exposed mica parts naturally brilliant without further treatment thereof, substantially as described.

DAVID F. SHOPE.

Witnesses:
 GEO. F. FELTS,
 R. BUSHNELL POTTS.